(12) United States Patent
Vannest et al.

(10) Patent No.: US 12,334,785 B2
(45) Date of Patent: Jun. 17, 2025

(54) ARCHITECTURE FOR AN ELECTRIC POWER GENERATOR FOR AVIATION

(71) Applicant: The Boeing Company, Chicago, IL (US)

(72) Inventors: Jeremiah Vannest, Columbus, OH (US); Lijun Gao, Renton, WA (US); Julia Zhang, Dublin, OH (US); Shengyi Liu, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 69 days.

(21) Appl. No.: 18/150,570

(22) Filed: Jan. 5, 2023

(65) Prior Publication Data

US 2023/0216387 A1 Jul. 6, 2023

Related U.S. Application Data

(60) Provisional application No. 63/296,661, filed on Jan. 5, 2022.

(51) Int. Cl.
*H02K 19/38* (2006.01)
*B64D 27/24* (2024.01)

(52) U.S. Cl.
CPC ............. *H02K 19/38* (2013.01); *B64D 27/24* (2013.01); *B64D 2221/00* (2013.01); *H02J 2310/44* (2020.01)

(58) Field of Classification Search
None
See application file for complete search history.

(56) References Cited

U.S. PATENT DOCUMENTS

| | | | |
|---|---|---|---|
| 11,283,382 B1 * | 3/2022 | Miskovic | H02P 9/42 |
| 2016/0325629 A1 * | 11/2016 | Siegel | B60L 50/15 |
| 2018/0023529 A1 * | 1/2018 | Huang | F02C 7/268 |
| | | | 290/36 R |

* cited by examiner

*Primary Examiner* — Jared Fureman
*Assistant Examiner* — Aqeel H Bukhari
(74) *Attorney, Agent, or Firm* — Harrity & Harrity, LLP

(57) ABSTRACT

A system, apparatus, and/or method for an aircraft that provides a novel independent-speed variable-frequency generator for aviation power generation. The generator architecture utilizes a 2-stage generator architecture with a wound rotor PM exciter (PME) that provides excitation to the rotor of a generator. A rotating bi-directional AC/DC/AC electric power converter connects the rotor windings of the exciter and the generator.

20 Claims, 12 Drawing Sheets

ARCHITECTURE FOR AN ELECTRIC POWER GENERATOR FOR AVIATION

CROSS-REFERENCE TO RELATED APPLICATIONS

This application claims the benefit of U.S. Provisional Patent Application No. 63/296,661 filed on Jan. 5, 2022, the disclosure of which is hereby incorporated by reference.

INTRODUCTION

Known electrical power generators employed in aircraft require a constant speed drive (CSD) to maintain the generator shaft speed so that the output frequency is kept at a constant frequency, e.g., at a frequency of 400 Hz.

Known variable-speed variable-frequency generators (VSVF) require a 3-stage architecture in order to fully control the field excitation of the generator with no brushes. A 3-stage architecture has many components including two sets of electric power converters. These many stages may affect the reliability as well as the total mass of the system.

Known constant-speed constant-frequency generators (CSCF) used in aircraft require a constant-speed drive (CSD) to couple with an engine. The CSD functions to maintain the generator shaft speed so that the output frequency is kept at a constant frequency, e.g., at a frequency of 400 Hz. Three-stage generators used on more-electric aircrafts include a pre-exciter or PE, a main exciter or ME, and a main generator or MG. The 3-stage generator is self-excited by the PE. There is a controllable rectifier on the stator between the PE and the ME, and another on-shaft rectifier between the ME and the MG. There is a DC excitation on the MG rotor winding. However, the MG output frequency is dependent on the rotor speed and must use a constant speed drive or full output power inverter if output frequency is to be maintained. Furthermore, the CSD is a complex and heavy mechanical system with high maintenance cost and relatively short service life.

Known variable-speed variable-frequency generators (VSVF) may eliminate CSD but produce AC power with a wide range of frequencies dependent on the engine speed. This may require separate conversion equipment such as a full power AC/DC/AC electric power converter to maintain the frequency to an appropriate level for some specific applications, for example, to drive a propulsion motor. The consequence is that the system becomes more complicated and may adversely affect the system efficiency and reliability.

SUMMARY

The concepts described herein provide a system, apparatus, and/or method for an aircraft that provides a novel independent-speed variable-frequency generator for aviation power generation. The generator architecture utilizes a 2-stage generator architecture with a wound rotor PM exciter (PME) that provides excitation to the rotor of a wound rotor asynchronous generator (WRAG). A rotating bi-directional AC/DC/AC electric power converter connects the rotor windings of the exciter and the generator.

The rotating bi-directional AC/DC/AC electric power converter enables the generator output frequency to be maintained through controlling the frequency of the generator rotor winding as the mechanical speed changes. The bi-directional aspect of the electric power converter enables for the largest possible speed range as the system may fluidly operate across both negative and positive rotor frequencies. The electric power converter may also control the exciter rotor winding excitation to allow for control optimization of the PM exciter. The electric power converter decouples the frequency of the two rotor windings which enables for a compact exciter as it may provide the necessary power to the generator rotor winding at a high frequency. The controls of the rotating AC/DC/AC electric power converter may be implemented through wireless communication technology.

An aspect of the disclosure may include an electric power generator for an aircraft having a two-stage variable-frequency generator including a main generator, a permanent magnet exciter, a rotating bi-directional AC/DC/AC electric power converter system, and a controller. The rotating bi-directional AC/DC/AC electric power converter system is coupled to a rotatable shaft; and the rotating bi-directional AC/DC/AC electric power converter system includes a first rotating bi-directional electric power converter for AC/DC conversion and a second rotating bi-directional electric power converter for DC/AC conversion.

Another aspect of the disclosure may include the two-stage variable-frequency generator being a two-stage independent-speed variable-frequency generator.

Another aspect of the disclosure may include the two-stage variable-frequency generator being a two-stage variable-speed variable-frequency generator.

Another aspect of the disclosure may include the rotating bi-directional AC/DC/AC electric power converter system being coupled to the rotatable shaft comprises a first rotor winding of the permanent magnet exciter and a second rotor winding of the main generator being coupled to the rotatable shaft.

Another aspect of the disclosure may include the controller having a first controller for controlling the first rotating bi-directional electric power converter for AC/DC conversion, and a second controller for controlling the second rotating bi-directional electric power converter for DC/AC conversion.

Another aspect of the disclosure may include the first controller for controlling the first rotating bi-directional electric power converter for AC/DC conversion monitoring voltage of a first rotor winding of the permanent magnet exciter and monitoring voltage of the DC power link, and controlling the first rotating bi-directional electric power converter to control voltage level of the DC power link based upon the voltage of the first rotor winding of the permanent magnet exciter and the voltage of the DC power link.

Another aspect of the disclosure may include the second controller for controlling the second rotating bi-directional electric power converter for DC/AC conversion monitoring a voltage of a generator rotor winding of the main generator and monitors voltage of a generator stator winding of the main generator, and controls the second rotating bi-directional electric power converter based upon the voltage of the generator rotor winding of the main generator and the voltage of the generator stator winding of the main generator.

Another aspect of the disclosure may include the first controller communicating wirelessly with the first rotating bi-directional electric power converter.

Another aspect of the disclosure may include the second controller communicating wirelessly with the second rotating bi-directional electric power converter.

Another aspect of the disclosure may include the main generator having a generator stator winding that is electrically connected to an AC power bus, wherein the exciter rotor winding is controllable to a variable frequency, and wherein the controller controls the generator stator winding to provide an output to the AC power bus at a constant frequency.

Another aspect of the disclosure may include the permanent magnet exciter being decoupled from the main generator by the rotating bi-directional AC/DC/AC electric power converter system.

Another aspect of the disclosure may include the permanent magnet exciter being operable to generate electric power at a frequency that is variable coincident with the operation of the exciter rotor winding of main generator at the constant frequency.

Another aspect of the disclosure may include an electric power generator for an aircraft having a two-stage variable-frequency generator including a main generator and a permanent magnet exciter, a controllable rectifier, and a controller. The permanent magnet exciter includes a first rotor winding that is coupled to a rotatable shaft, the controllable rectifier is arranged to rectify electric power between the first rotor winding of the permanent magnet exciter and a field winding of the main generator, and the controller is configured to regulate a stator output voltage of the main generator according to a control law.

Another aspect of the disclosure may include the control law operating in accordance with the following relationship:

$$V_6 = (M_1 \cdot \omega_{sh}^2 - M_2 \cdot I_3 \cdot \omega_{sh}) \cdot D$$

wherein: $V_6$ represents the stator output voltage of the main generator, $I_3$ represents current through the first rotor winding of the permanent magnet exciter, $\omega_{sh}$ represents rotating speed of the shaft, D represents duty cycle, value from 0 to 1, and $M_1$ and $M_2$ represent constants.

Another aspect of the disclosure is a control system for an electric power generator for an aviation application that includes a two-stage independent-speed variable-frequency generator including a main generator, a wound rotor permanent magnet exciter, a rotating bi-directional AC/DC/AC electric power converter system coupled to a rotatable shaft, and a controller. The rotating bi-directional AC/DC/AC electric power converter system includes a first rotating bi-directional electric power converter configured for AC/DC conversion and a second rotating bi-directional electric power converter configured for DC/AC conversion. The controller is arranged to control a magnitude and a frequency of the main generator.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
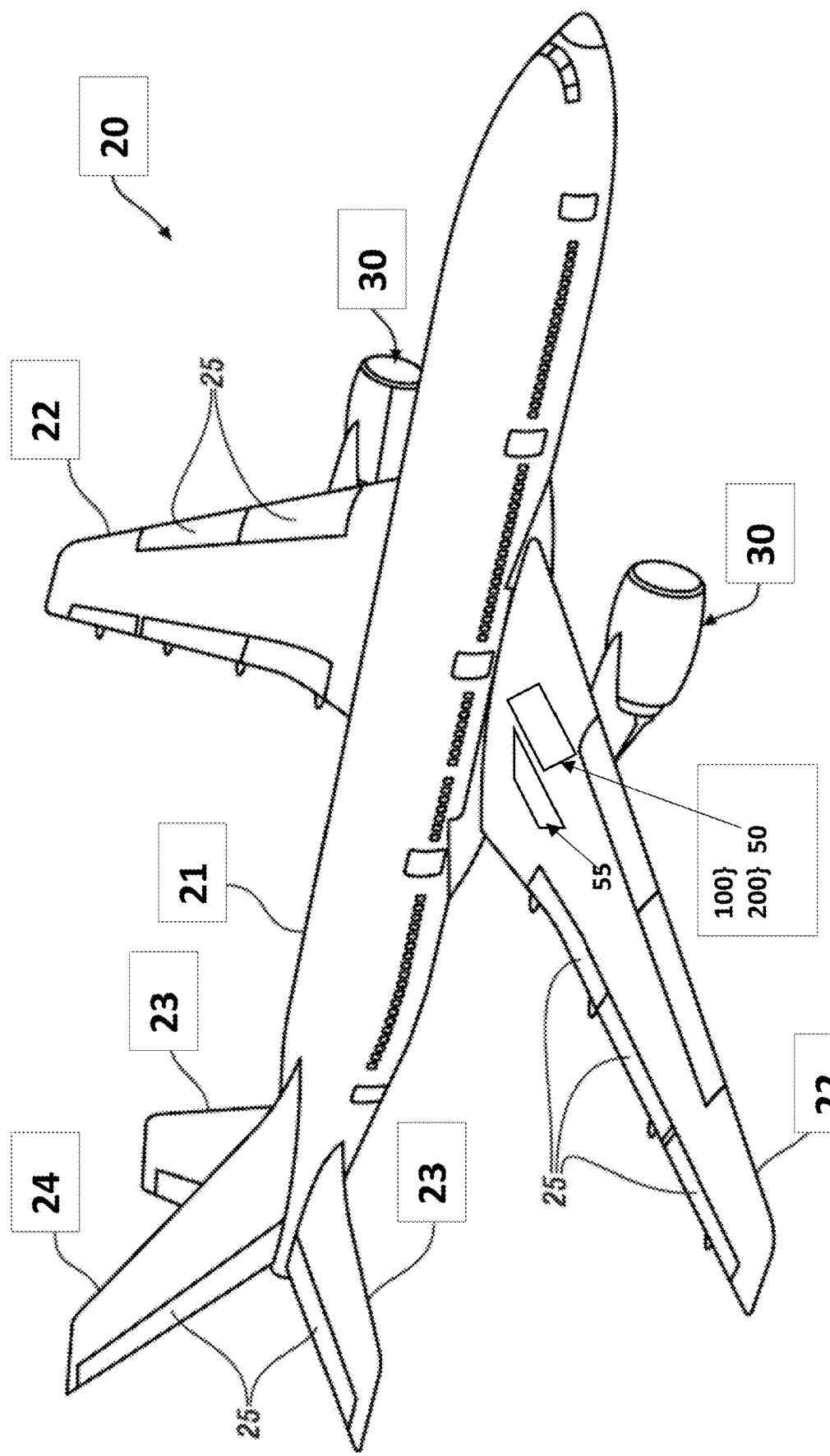
FIG. 1 schematically illustrates a fixed wing aircraft having a turbine engine rotatably coupled to a novel electric power generator, in accordance with the disclosure.

FIG. 1 schematically illustrates a fixed wing aircraft 20 having one or multiple turbine engines 30, wherein at least one of the turbine engines 30 is rotatably coupled to a novel two-stage variable-frequency electric power generator 50 via a rotatable shaft 32 and intervening gearbox in one embodiment, such as described hereinbelow. In one embodiment, and as described with reference to FIGS. 2 through 5, a first embodiment of the two-stage variable-frequency electric power generator 50 is configured as a two-stage, independent-speed variable-frequency (ISVF) generator 100. In one embodiment, and as described with reference to FIGS. 6 through 9, a second embodiment of the two-stage variable-frequency electric power generator 50 is arranged as a two-stage, variable-speed, variable-frequency (VSVF) generator 200.

Embodiments of the two-stage variable-frequency electric power generator 50 include a Generator Control Unit (GCU) 10 that is arranged to control first and second bi-directional electric power converters (converters) 4, 6, respectively, to control both an output voltage magnitude and an output frequency of electric power on an AC power bus 19 that is transferable to an on-aircraft electric power system 55. The GCU 10 also controls magnitude of DC bus voltage on the DC power link 5. The flexibility of having control over the DC bus voltage allows for the optimization of the system for parameters such as THD, voltage stress, and efficiency as speed and load of the two-stage variable-frequency electric power generator 50 varies.

The aircraft 20 includes a fuselage 21, one or more wings 22, horizontal stabilizers 23, and a vertical stabilizer 24. Each of the one or more wings 22, horizontal stabilizer 23, and vertical stabilizer 24 includes a moveable surface 25 that is arranged on an outside skin of the aircraft 20. The moveable surfaces 25 include, e.g., flaps, ailerons, elevators, stabilizers, etc. Examples of the aircraft 20 include an airplane, a commercial aircraft, and/or a military aircraft. Alternatively, the concepts described herein may be employed as a propulsion device on a flying car, a drone, an electric vertical takeoff and landing vehicle (eVTOL), etc. Alternatively, the concepts described herein may be employed as a propulsion device on a marine system.

Referring again to FIG. 2, the first embodiment of the two-stage variable-frequency electric power generator 50 that is configured as the two-stage ISVF generator 100 is described. The two-stage ISVF generator 100 includes a permanent magnet (PM) Exciter (PME) 1 that includes a permanent magnet stator 2 and an exciter rotor winding (erw) 3, a first rotating bi-directional electric power converter 4 for AC/DC electric power conversion, a DC power link 5, a second rotating bi-directional electric power converter 6 for DC/AC electric power conversion, and a main generator or MG 9 that includes a generator rotor winding (grw) 7 and a generator stator winding (gsw) 8. A Generator Control Unit or GCU 10 monitors and controls the various elements via a communication link 11, which may be wireless in one embodiment. The first rotating bi-directional electric power converter 4, the DC power link 5, and the second rotating bi-directional electric power converter 6 form a rotating bi-directional AC/DC/AC electric power converter 33.

The control architecture of the two-stage ISVF generator 100 is executed by the GCU 10, which may be separated into a first controller 12-1 for controlling the first rotating bi-directional electric power converter (AC/DC) 4, and a second controller 12-2 for controlling the second rotating bi-directional electric power converter (DC/AC) 6. Converter 1 uses signals 13 from the PME rotor winding (erw) 3 and signals 15 from the DC power link 5 as feedback to send out a control signal 14 to adjust the DC bus voltage at the DC power link 5. Converter 2 uses first signals 18 from the generator stator winding (gsw) 8 and second signals 17 from the generator rotor winding (grw) 7 as feedback to send out control signal 16 to adjust the MG rotor excitation on the generator rotor winding 7 and the generator output voltage at the generator stator winding 8. The control architecture is the same for operation in both mode 1 and mode 2 employing different commands and different direction of power flow. Signals may be passed to and from the rotor and stator through the communication link 11. The rotating bi-directional AC/DC/AC electric power converter 33 is controllable by the first and second controllers 12-1, 12-2 of the GCU 10 to provide an independent speed variable frequency generator for aviation power generation. The generator architecture utilizes a 2-stage generator architecture with a wound rotor PM exciter (PME) that provides excitation to the rotor of a wound rotor asynchronous generator (WRAG). The rotating bi-directional AC/DC/AC electric power converter 33 connects the rotor windings of the exciter 1 and the main generator 9.

The rotating bi-directional AC/DC/AC electric power converter 33 allows the generator output frequency to be maintained by controlling the frequency of the generator rotor winding as the mechanical speed changes. The bi-directional aspect of the electric power converter allows for the largest possible speed range as the system may fluidly operate across both negative and positive rotor frequencies. The electric power converter may also control the exciter rotor winding excitation to allow for control optimization of the PM exciter. The electric power converter decouples the frequency of the two rotor windings which allows for a compact exciter as it may provide the necessary power to the generator rotor winding at a high frequency. The controls of the rotating AC/DC/AC electric power converter may be implemented through wireless communication technology.

The architecture includes two generator stages and two electric power converters. The output frequency of this generator is independent from the input shaft speed without the use of a constant speed drive (CSD) or a full power converter. Because of this, the total number of components for this architecture may be reduced. With this reduction in components, the total mass, cost, and overall complexity of the system may be decreased, and may also reduce mechanical losses that are otherwise introduced by a CSD in a known 3-stage architecture.

The relationship between each winding and the mechanical speed of the shaft 32 are shown in the equations below, wherein $f_{gsw}$ represents the frequency of the MG stator winding 8, $f_{grw}$ represents the frequency of the MG rotor winding 7, $f_{erw}$ represents the frequency of the PME rotor winding 3, $f_{gr}$ represents the electrical frequency of the MG rotor, $f_{er}$ represents the electrical frequency of the of the PME rotor.

$$f_{gsw} = f_{grw} + f_{gr}$$

$$f_{er} = -f_{erw} \quad [1]$$

The equations relating the mechanical rotor speed to electrical rotor speed are given below, wherein $n_r$ is the shaft 32 speed in rpm, $p_e$ is the exciter rotor pole number, and $p_g$ is the generator rotor pole number.

$$f_{gsw} = n_r * p_e / 120$$

$$f_{gr} = n_r * p_g / 120 \quad [2]$$

By controlling the generator rotor winding frequency, the output on the generator stator may be maintained or controlled at a fixed or constant frequency, e.g., 400 Hz. The exciter rotor winding frequency is high relative to the generator rotor winding frequency. This decoupling of the rotor winding frequencies allows the exciter to achieve high power density by operating at the higher exciter rotor winding frequency.

The active power equations include as follows:

$$P_{grw} = P_{gsw} \times \frac{f_{grw}}{f_{gsw}} \quad [3]$$

$$P_{erw} = -P_{grw}$$

$$P_g = P_{gsw} + P_{grw}$$

$$P_e = P_{erw}$$

wherein:
$P_g$ is the MG mechanical power,
$P_e$ is the PME mechanical power,
$P_{gsw}$ is the MG stator winding active power,
$P_{grw}$ is the MG rotor winding active power, and
$P_{erw}$ is the PME rotor winding active power, Using the active equations (i.e., Eq. 3) in conjunction with the frequency equations (i.e., Eqs. 1 and 2) the relationship between the shaft speed and the active power of the windings may be established for a choice of poles, output power, and output frequency. Using this relationship, the system may be designed to limit the rotor power to a certain percentage of the output power over a specific speed range. This allows for the power electronics to be sized for a smaller power rating.

Figure 2:
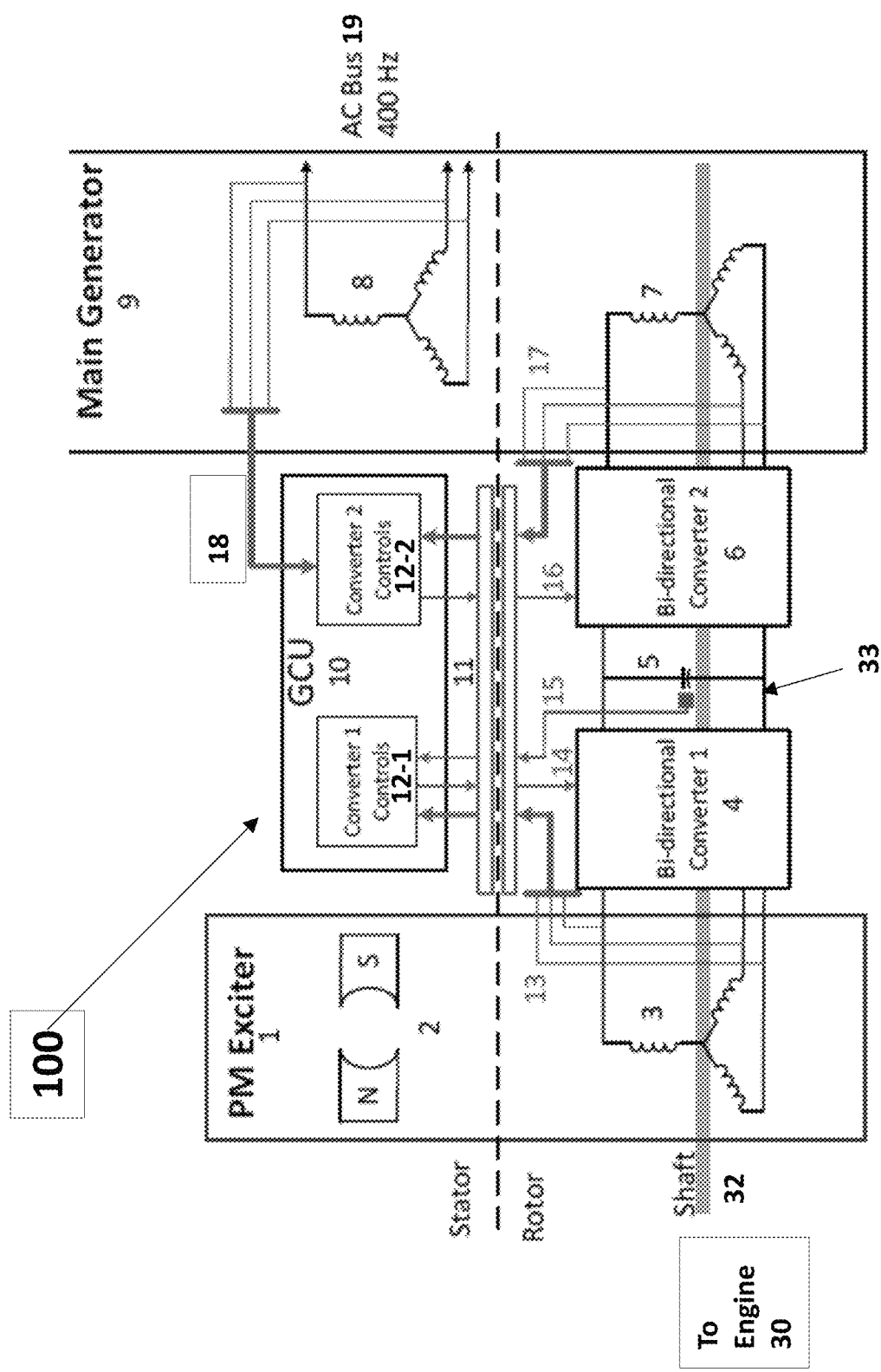
FIG. 2 schematically illustrates an embodiment of a two-stage independent-speed variable-frequency generator for generating electric power on an aircraft, in accordance with the disclosure.
Figure 3:
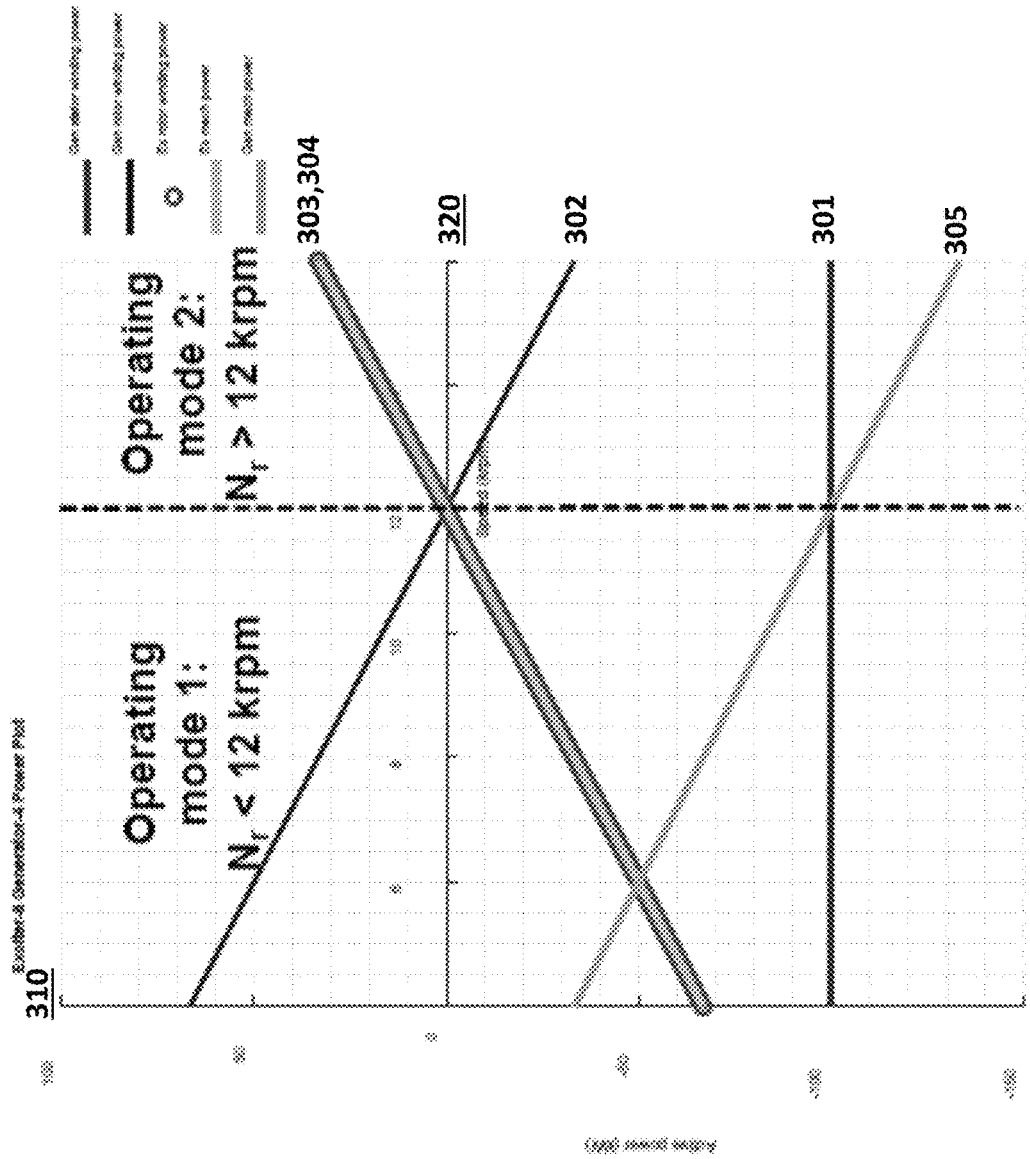
FIG. 3 graphically illustrates power graphs that are related to operation of a two-stage independent-speed variable-frequency generator for generating electric power on an aircraft, in accordance with the disclosure.

FIG. 3 graphically illustrates power graphs that are related to operation of an embodiment of the two-stage ISVF generator 100 that is described with reference to FIG. 2. Plotted data includes power graphs in the form of generator stator winding power 301, generator rotor winding power 302, excitation rotor winding power 303, excitation mechanical power 304, and generator mechanical power 305. The data is shown with active power (kW) 310 on a vertical axis in relation to rotational speed (krpm) 320 on a horizontal axis. Based on the power graphs, two different operating modes may be identified for any combination of poles based on the polarity of the winding power and frequency. For the entire operating range, the frequency of the MG stator is always positive 400 Hz. However, the rotor frequency and power will swap polarities at a one specific mechanical speed determined by the pole selection of the MG. By way of a non-limiting example, a pole combination that includes a 6-pole PME and a 4-pole MG has two separate operating modes wherein the rotor power swaps polarity at a predetermined speed. The first operating mode occurs when $N_r$ (rotor speed)<12 krpm and the second operating mode occurs when $N_r$>12 krpm.

Figure 4:
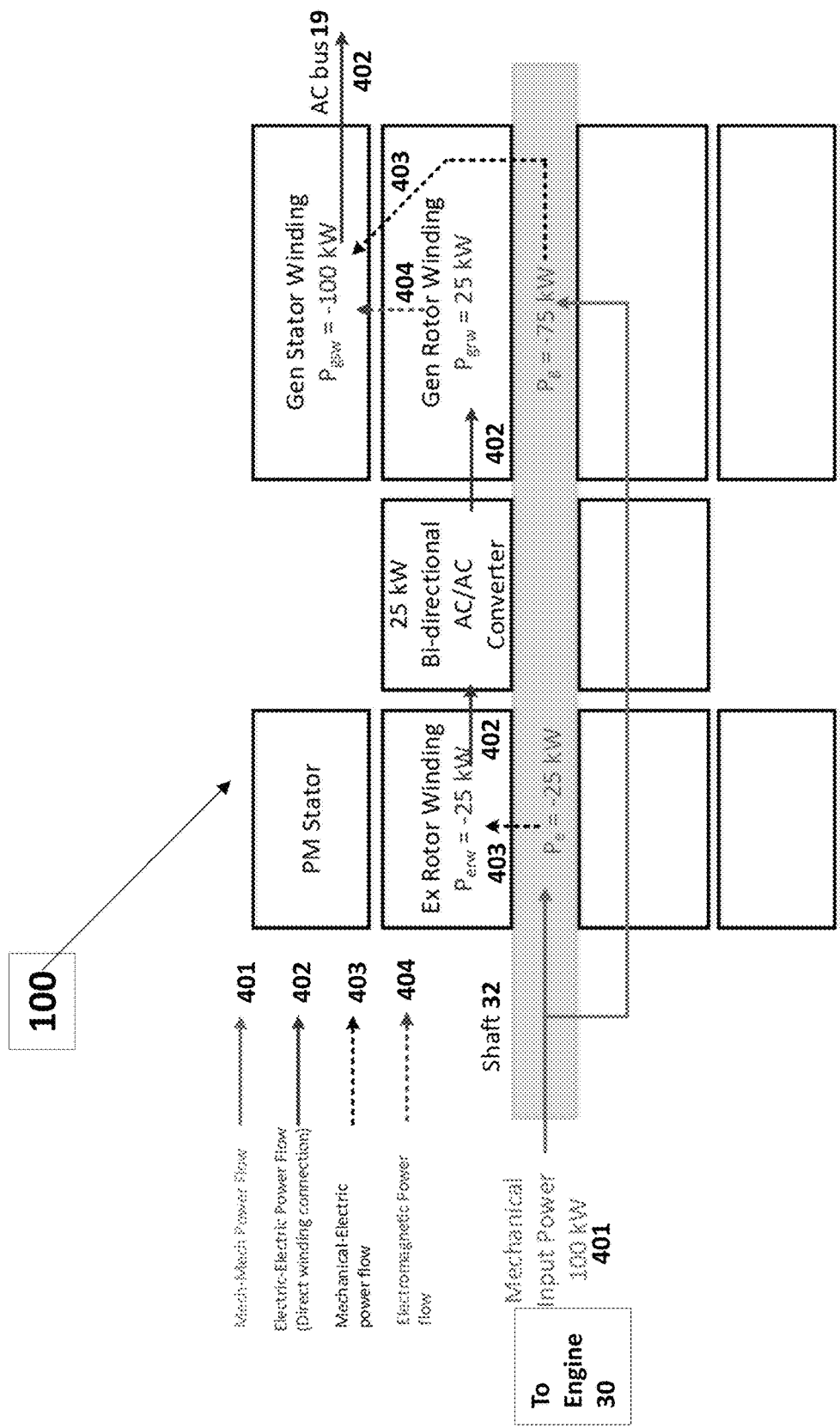
FIG. 4 schematically illustrates a first example of power flow through an embodiment of the two-stage independent-speed variable-frequency generator when operating in a first operating mode, in accordance with the disclosure.

FIG. 4 schematically illustrates a first example of power flow through an embodiment of the two-stage ISVF generator 100 that is described with reference to FIG. 2. This depiction of the power flow is in the first operating mode is at an operating point of 9 krpm for a 6-pole exciter/4-pole generator device. In the first operating mode, the MG rotor frequency is positive, and part of the mechanical input power is transferred through the PME rotor winding to the MG rotor winding and finally to the MG stator winding. The magnitudes of active power that are being transferred are determined based upon the power equations (Eq. 3) The depicted power flows include a mechanical-to-mechanical power flow 401, an electric-to-electric power flow 402, a mechanical-to-electric power flow 403, and an electromagnetic power flow 404.

The following terms apply throughout the specification. The term $P_g$ represents the MG mechanical power, wherein the MG is operating as a motor with electrical power being converted to mechanical output at a positive power polarity, and wherein mechanical power being converted to electrical power at a negative power polarity. The term $P_e$ represents the PME mechanical power, which is being used as a motor by adding to the mechanical power on the shaft 32 to deliver additional mechanical load at a positive power polarity, and wherein the PME mechanical power is converted to electrical power at a negative power polarity. The term $P_{gsw}$ represents the MG stator winding active power, wherein electrical power is applied to the MG stator winding, which is converted to mechanical power on the shaft 32 at a positive power polarity, and wherein electrical power is being delivered to a separate electric load from the MG stator winding at a negative power polarity. The term $P_{grw}$ represents the MG rotor winding active power, wherein electrical power is being consumed and used to convert into some other form of power (e.g., electromechanical) at a positive power polarity, and wherein the MG shaft mechanical power is converted to electrical power on the MG stator winding, which may be used to power an electrical load at a negative power polarity. The term $P_{erw}$ represents the PME rotor winding active power, wherein the electrical power is being consumed and used to convert into some other form of power (e.g., electromechanical) at a positive power polarity, and wherein the electrical power is being delivered to a separate electric load at a negative power polarity.

Figure 5:
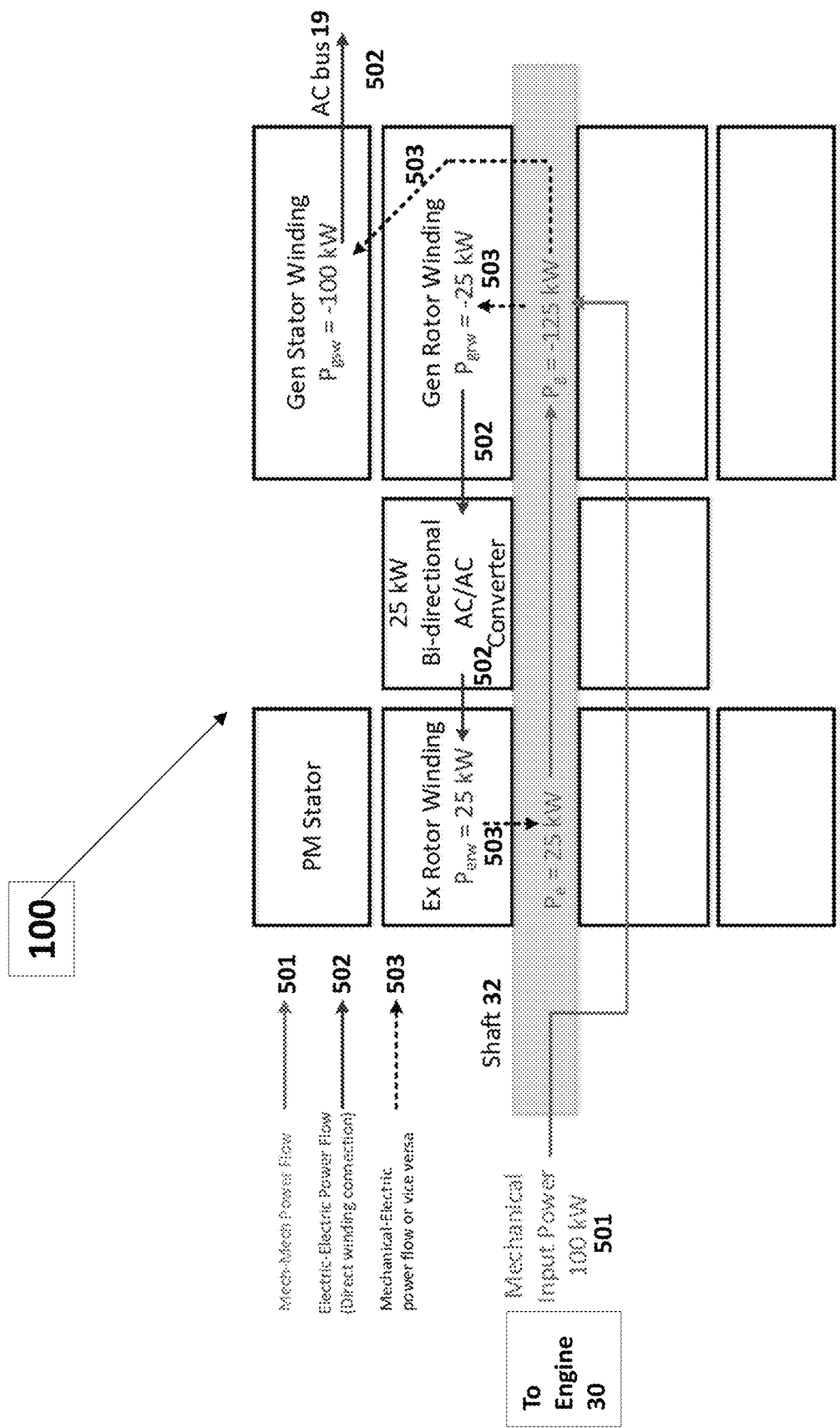
FIG. 5 schematically illustrates a second example of power flow through an embodiment of the two-stage independent-speed variable-frequency generator when operating in a second operating mode, in accordance with the disclosure.

FIG. 5 schematically illustrates a second example of power flow through an embodiment of the two-stage ISVF generator 100 that is described with reference to FIG. 2. This depiction of the power flow is in the second operating mode is at an operating point of 15 krpm for a 6-pole exciter/4-pole generator device. In the second operating mode, the MG rotor frequency is negative, and part of the mechanical input power is transferred through the PME rotor winding to the MG rotor winding and finally to the MG stator winding. The magnitudes of active power that are being transferred are determined based upon the power equations (Eq. 3). The depicted power flows include a mechanical-to-mechanical power flow 501, an electric-to-electric power flow 502, and a mechanical-to-electric power flow 503. $P_g$ represents the MG mechanical power, $P_e$ represents the PME mechanical power, $P_{gsw}$ represents the MG stator winding active power, $P_{grw}$ represents the MG rotor winding active power, and $P_{erw}$ represents the PME rotor winding active power. For the second operating mode, the mechanical power demanded by the generator is actually larger than the input mechanical power and part of that power leads to generation in the MG rotor winding. The power then flows to the PME which motors and adds to the input mechanical power so that the MG may provide the necessary mechanical power.

Referring now FIGS. 6 through 9, the two-stage, variable speed variable frequency (VSVF) generator 200 for aviation power generation is described. The generator architecture utilizes a 2-stage generator architecture that includes a wound rotor synchronous generator (WRSG) 201 and a Main Generator (MG) 207 that are electrically coupled via a controllable AC/DC rectifier 204. The wound rotor permanent magnet exciter (PME) or WRSG 201 includes a wound rotor permanent magnet exciter (PME) 202 that provides field excitation for a rotor winding 203 of the wound rotor synchronous generator (WRSG) 201. Connecting the rotor windings of the exciter and generator is a controllable AC/DC rectifier 204 that allows for the field excitation of the WRSG 201 to be adjusted. The frequency output of this 2-stage architecture depends on the speed of the rotating shaft 232. The controllable AC/DC rectifier 204 on the rotor of the generator may be communicated with via a communication link 209. The controllable AC/DC rectifier 204 is controllable to control the field excitation on the WRSG 201 to maintain a desired output voltage of the Main Generator 207.

Referring again to FIG. 6, the two-stage VSVF generator 200 includes a WRSG 201 having PM Exciter (PME) 202, i.e., a permanent magnet stator, exciter rotor winding (erw) (for AC excitation) 203, rotating controllable AC/DC rectifier 204, a WRSG field winding (for DC excitation) 205, a generator stator winding (gsw) 206, a Main Generator (MG) 207, a Generator Control Unit (GCU) 208, and communication link 209 for wireless signal communication.

Figure 6:
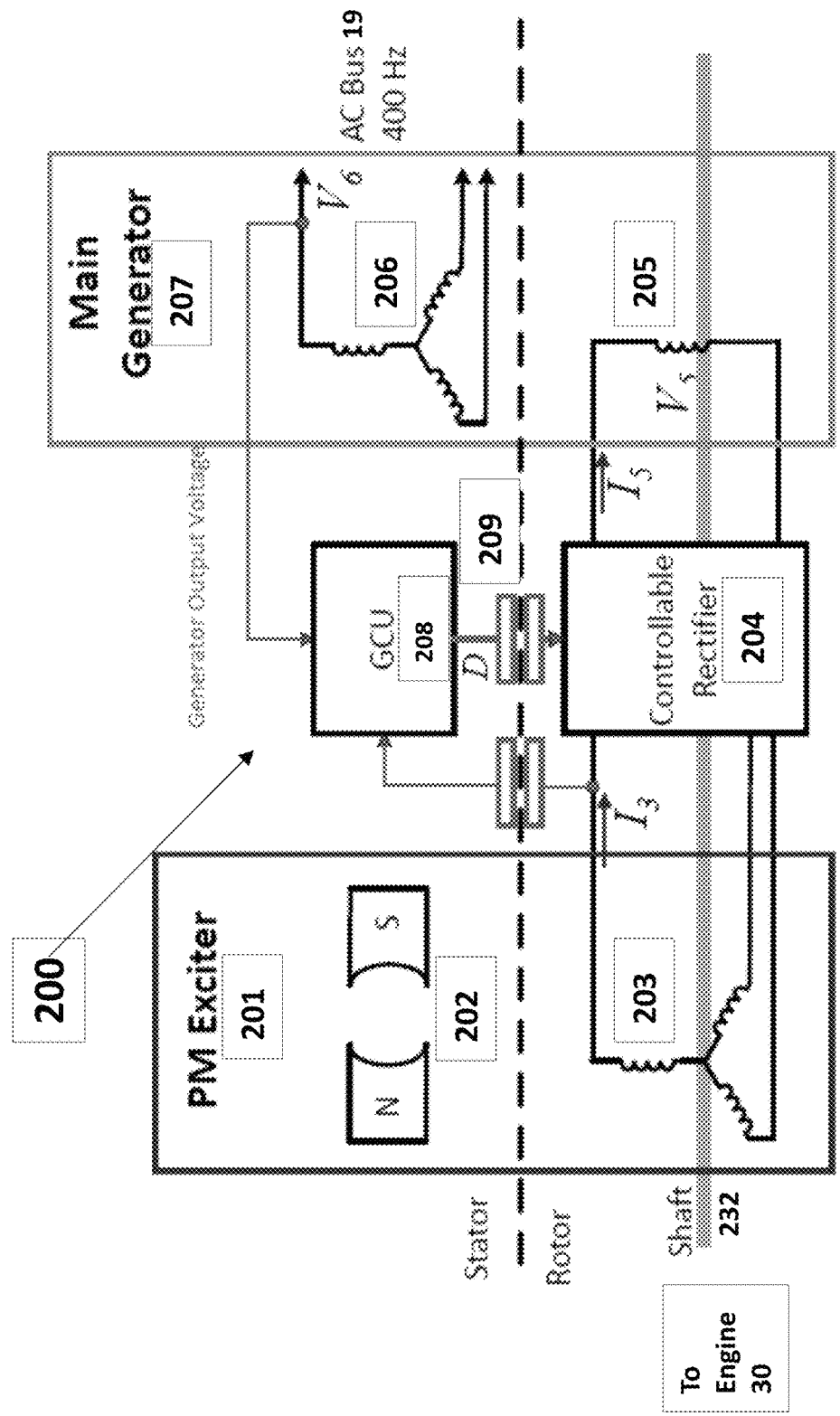
FIG. 6 schematically illustrates an embodiment of a two-stage, variable speed variable frequency (VSVF) generator for generating electric power on an aircraft, in accordance with the disclosure.
Figure 7:
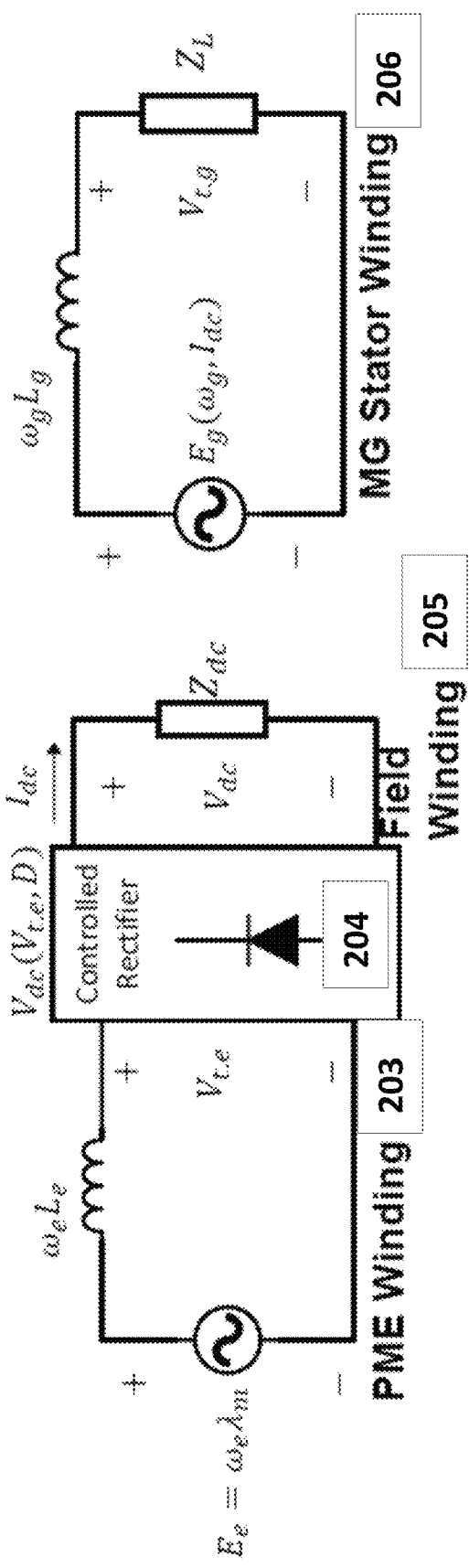
FIG. 7 schematically illustrates an equivalent circuit for an embodiment of the two-stage VSVF generator described with reference to FIG. 6, in accordance with the disclosure.
Figure 8:
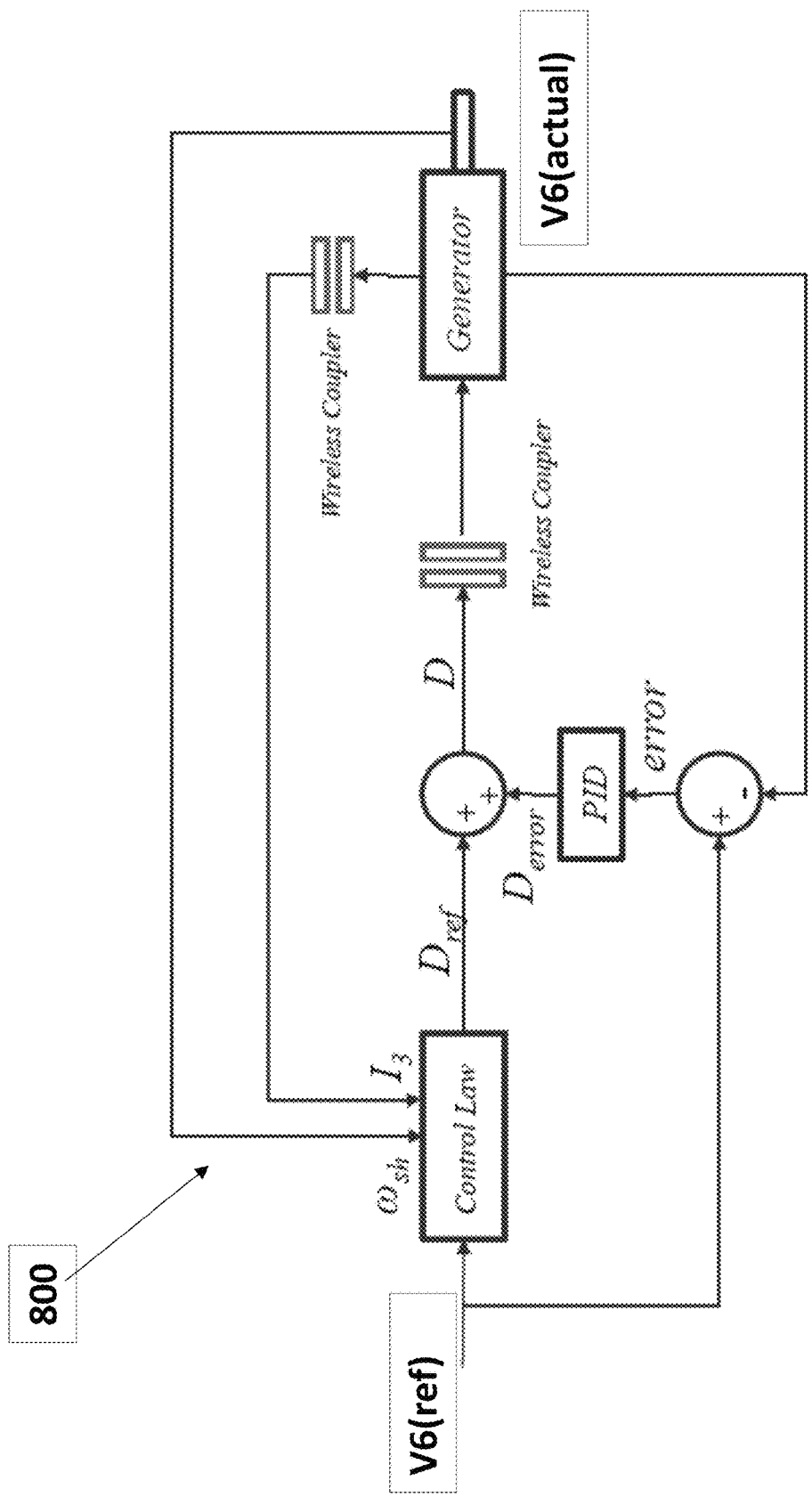
FIG. 8 schematically illustrates a control scheme for controlling an embodiment of the two-stage VSVF generator described with reference to FIG. 6, in accordance with the disclosure.

FIG. 7 schematically illustrates an equivalent circuit for the two-stage VSVF generator 200, which may be employed in controlling the MG output voltage at $V_{t,g}$. The speed and load of the MG may vary by adjusting the MG back EMF, $E_g$. The MG output voltage $V_{t,g}$ may be controlled to be constant within a range of operation for the load and speed. The back EMF $E_g$ is a function of the machine speed and the field excitation current $I_{dc}$. The magnitude of $I_{dc}$ may be controlled through the controlled rectifier. The current $I_{dc}$ is a function of the terminal voltage of the PME winding $V_{t,e}$, and the duty cycle D of the switching of the controlled AC/DC rectifier 204. The terms are defined as follows:

$E_e$—back EMF of exciter rotor winding
$\omega_e$—Electrical frequency of PME rotor winding
$\lambda_m$—Flux linkage provided by exciter magnets
$L_e$—Exciter rotor winding inductance
$V_{t,e}$—Exciter rotor winding terminal voltage
D—Duty cycle of rectifier switching
$I_{dc}$—DC field excitation of MG
$V_{dc}$—DC voltage excitation for MG field winding
$Z_{dc}$—MG rotor winding impedance
$E_g$—Back EMF of main generator stator winding
$\omega_g$—Electrical frequency of MG stator winding
$L_g$—MG stator winding inductance
$V_{t,g}$—MG output voltage at terminal
$Z_L$—Load impedance FIG. 8 schematically illustrates a control scheme 800 for controlling an embodiment of the two-stage VSVF generator 200 that is described with reference to FIG. 6. In order to implement the correct duty cycle on the AC/DC rectifier 204 that leads to the desired output voltage at the generator stator winding 206, output voltage sensor feedback and wirelessly transmitted PME current sensor data ($I_3$) are sent to the GCU 208 for control calculation based on the equations and relations described herein. The GCU 208 transmits control signals for the control of the rectifier switching.

The equations and relations include as follows:

$$V_6 = K_6 \cdot \omega_{sh} \cdot I_5$$

$$I_5 = K_5 \cdot V_5$$

$$V_5 = (E_3 - I_3 \cdot K_3) \cdot D$$

$$E_3 = \omega_{sh} \cdot \lambda_{PM}$$

$$V_6 = (K_6 \cdot K_5 \cdot \lambda_{PM} \cdot \omega_{sh}^2 - K_6 \cdot K_5 \cdot I_3 \cdot \omega_{sh}) \cdot D \quad [4]$$

The control law (Control Law) operates to control $V_6$ employing D to follow the target value $V_6$(ref), based upon feedback from $\omega_{sh}$, $I_3$ and $V_6$, which are measurable variables.

The control law has the following form, in one embodiment:

$$V_6 = (M_1 \cdot \omega_{sh}^2 - M_2 \cdot I_3 \cdot \omega_{sh}) \cdot D \quad [5]$$

wherein:
$V_6$: Voltage output at winding 206 (main generator stator winding),
$I_5$: Current through field winding 205, main excitation winding current,
$V_5$: DC Voltage across field winding 205, main excitation winding voltage,
$E_3$: Back EMF generated on rotor winding 203 (PM exciter rotor winding),
$I_3$: current through rotor winding 203 (PM exciter rotor winding),
$\omega_{sh}$: shaft rotating speed,
D: duty cycle, value from 0 to 1,
$\lambda_{PM}$: constant, Flux linkage provided by (PM) permanent magnets,
$K_6$, $K_5$, $K_3$: constant, pre-determined by generator design, and
$M_1$ and $M_2$ are constants.

The relationship between each winding and the mechanical speed of the shaft 32 are shown in the equations below.

$$f_{gsw} = f_{gr}$$

$$f_{er} = -f_{erw} \quad [6]$$

wherein $f_{gsw}$ is the frequency of the MG stator winding 8, $f_{erw}$ the frequency of the PME rotor winding 3, $f_{gr}$ the electrical frequency of the MG rotor winding 7, and $f_{er}$ the electrical frequency of the of the PME rotor 3.

The equations relating the mechanical rotor speed to electrical rotor speed are given below, wherein $n_r$ is the shaft speed in rpm, $p_e$ is the exciter rotor pole number, and $p_g$ is the generator rotor pole number. As the shaft speed increases, the frequencies of both the PME rotor winding and the MG stator winding increase.

$$f_{er} = \frac{n_r p_e}{120}$$

$$f_{gr} = \frac{n_r p_g}{120} \quad [7]$$

Figure 9:
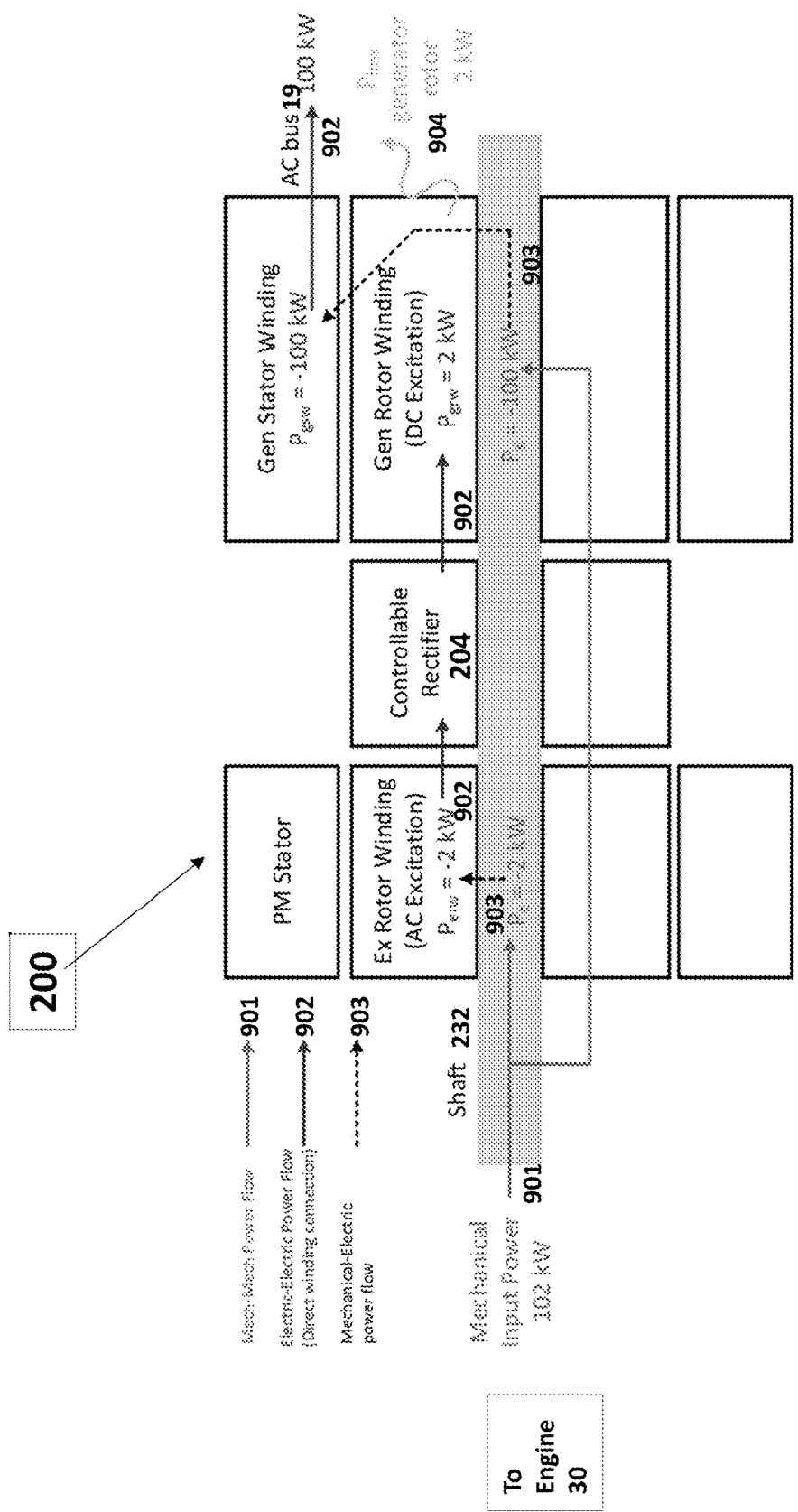
FIG. 9 schematically illustrates an example of power flow through an embodiment of the two-stage VSVF generator that is described with reference to FIG. 6, in accordance with the disclosure.

FIG. 9 schematically illustrates an example of power flow through an embodiment of the two-stage VSVF generator 200 that is described with reference to FIG. 6. This depiction of the power flow is in the first operating mode is at an operating point of 9 krpm for a 6-pole exciter/4-pole generator device. In the first operating mode, the MG rotor frequency is positive, and part of the mechanical input power is transferred through the PME rotor winding to the MG rotor winding and finally to the MG stator winding. The magnitudes of active power that are being transferred are determined based upon power equations. The depicted power flows include a mechanical-to-mechanical power flow 901, an electric-to-electric power flow 902, and a mechanical-to-electric power flow 903. A rotor power loss 904 is also depicted.

Figure 10:
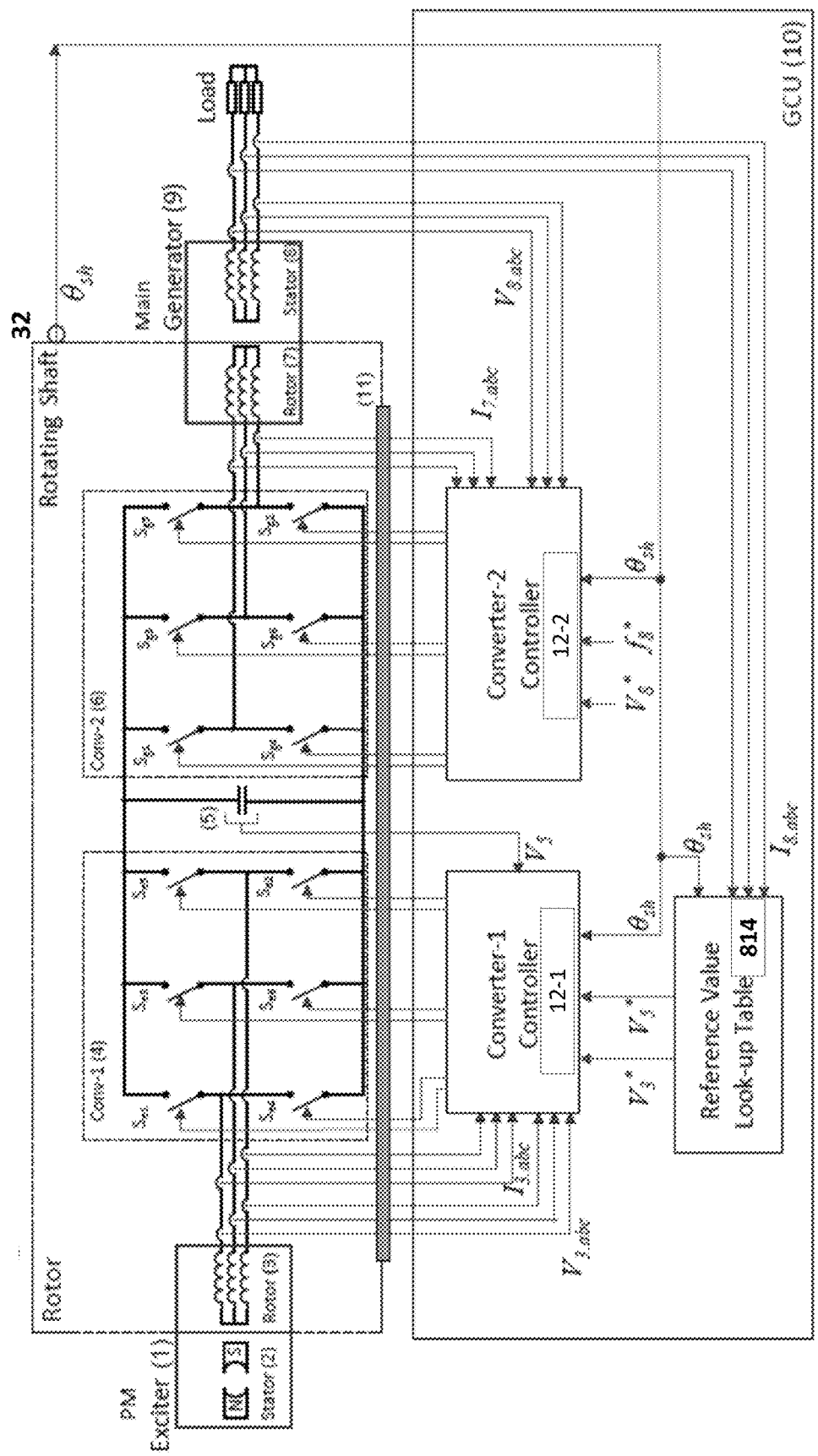
FIGS. 10, 11 and 12 schematically illustrate details of a control circuit for controlling operation of an embodiment of a two-stage variable-frequency generator, in accordance with the disclosure.

FIG. 10 schematically illustrates details of a control circuit for controlling operation of an embodiment of the two-stage ISVF generator 100 that is described with reference to FIG. 2.

Figure 11:
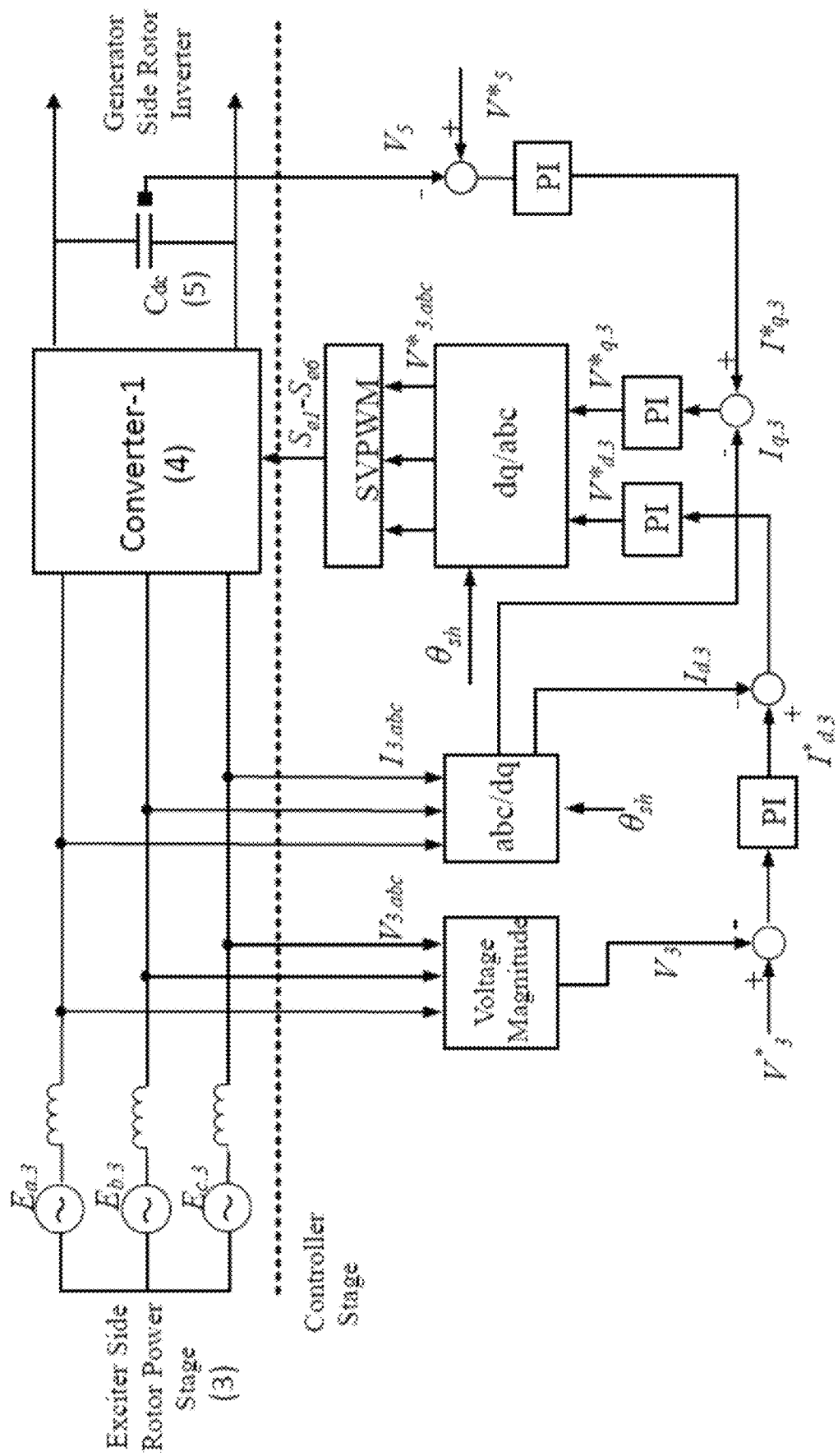

FIG. 11 schematically illustrates details of a portion of the control circuit of FIG. 10 associated with controlling the first electric power converter 4 of the two-stage ISVF generator 100.

Figure 12:
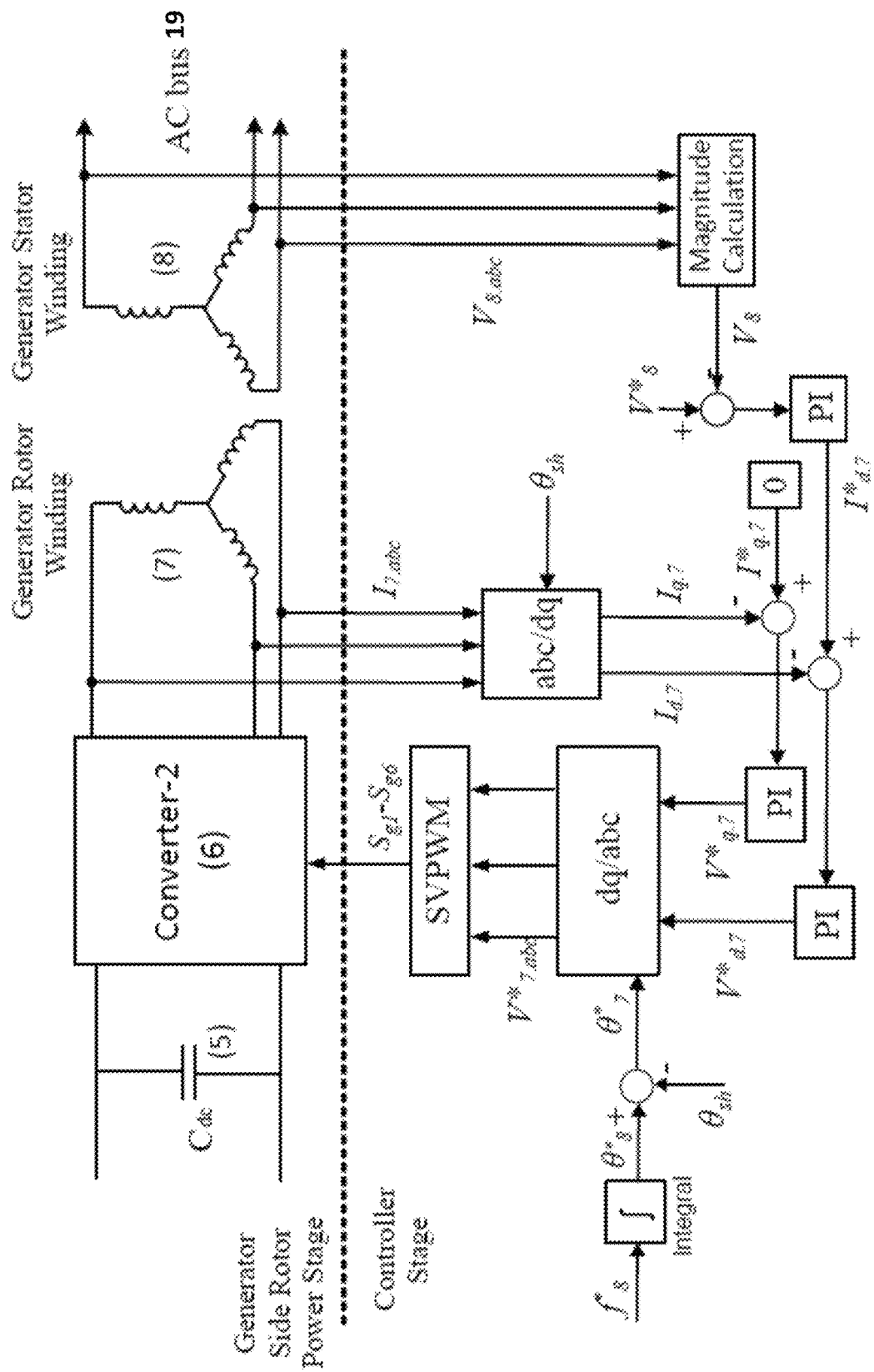

FIG. 12 schematically illustrates details of a portion of the control circuit of FIG. 10 associated with controlling the second electric power converter 6 of the two-stage ISVF generator 100.

The system architecture described herein provides two generator stages and a single power electronic electric power converter, thus reducing component counts as compared to present-day systems. With this reduction in power components, the total mass, cost, and overall complexity of the system may decrease.

This arrangement includes voltage magnitude control to electrically control exciter winding current (DC type), thus controlling the excitation magnetic field, which in turn may be used to control magnitude of output voltage. Frequency control may be achieved through controlling the main excitation winding AC current frequency. Thus, achieving constant frequency without hardware such as a constant speed device. Generator rotor DC bus voltage magnitude control is achieved by performing field weakening to lower voltage stress and allow for wider shaft rotation speed range.

Embodiments may be described herein in terms of functional and/or logical block components and various processing steps. Such block components may be realized by any number, combination or collection of mechanical and electrical hardware, software, and/or firmware components configured to perform the specified functions. For example, an embodiment of the disclosure may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the embodiments may be practiced in conjunction with any number of mechanical and/or electronic systems, and that the systems described herein are merely illustrative of possible implementations.

The use of ordinals such as first, second, and third does not necessarily imply a ranked sense of order, but rather may only distinguish between multiple instances of an act or structure.

Unless otherwise defined, all technical and scientific terms used in this specification have the same meanings as commonly understood by those skilled in the art to which the present disclosure pertains. The terms used in this specification are intended only for describing specific implementations, and not intended to limit the present disclosure. As used in this specification, the term "and/or" includes a combination of one or more associated listed items.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using communication links, e.g., communication link 11, which may be a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

A parameter is defined as a measurable quantity that represents a physical property of a device or other element that is discernible using one or more sensors and/or a physical model. A parameter may have a discrete value, e.g., either "1" or "0", or may be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that may direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An electric power generator for an aircraft, comprising:
a two-stage variable-frequency generator including a main generator, a permanent magnet exciter, a rotating bi-directional AC/DC/AC electric power converter system, and a controller;
wherein the rotating bi-directional AC/DC/AC electric power converter system is coupled to a rotatable shaft;
wherein the rotating bi-directional AC/DC/AC electric power converter system includes a first rotating bi-directional electric power converter for AC/DC conversion and a second rotating bi-directional electric power converter for DC/AC conversion;
wherein the first rotating bi-directional electric power converter and the second rotating bi-directional electric power converter are disposed adjacent to one another along the rotatable shaft; and
wherein the first rotating bi-directional electric power converter is electrically coupled to the second rotating bi-directional electric power converter via a DC power link.

2. The electric power generator of claim 1, wherein the two-stage variable-frequency generator comprises a two-stage independent-speed variable-frequency generator.

3. The electric power generator of claim 1, wherein the two-stage variable-frequency generator comprises a two-stage variable-speed variable-frequency generator.

4. The electric power generator of claim 1, wherein the rotating bi-directional AC/DC/AC electric power converter system being coupled to the rotatable shaft includes comprises a first rotor winding of the permanent magnet exciter and a second rotor winding of the main generator being coupled to the rotatable shaft.

5. The electric power generator of claim 1, wherein the controller includes a first controller for controlling the first rotating bi-directional electric power converter for AC/DC conversion, and a second controller for controlling the second rotating bi-directional electric power converter for DC/AC conversion.

6. The electric power generator of claim 5, wherein the first controller for controlling the first rotating bi-directional electric power converter for AC/DC conversion monitors voltage of a first rotor winding of the permanent magnet exciter and monitors voltage of the DC power link, and controls the first rotating bi-directional electric power converter to control voltage level of the DC power link based upon the voltage of the first rotor winding of the permanent magnet exciter and the voltage of the DC power link.

7. The electric power generator of claim 5, wherein the second controller for controlling the second rotating bi-directional electric power converter for DC/AC conversion monitors voltage of a first stator winding of the main generator and monitors voltage of a first rotor winding of the main generator, and controls the second rotating bi-directional electric power converter based upon the voltage of the first rotor winding of the main generator and the voltage of the first stator winding of the main generator.

8. The electric power generator of claim 5, wherein the first controller communicates wirelessly with the first rotating bi-directional electric power converter.

9. The electric power generator of claim 5, wherein the second controller communicates wirelessly with the second rotating bi-directional electric power converter.

10. The electric power generator of claim 1, wherein the main generator includes a first stator winding that is electrically connected to an AC power bus and a first rotor winding;
wherein the permanent magnet exciter includes a second rotor winding;
wherein the second rotor winding is controllable to a variable frequency; and
wherein the controller controls the first stator winding to provide an output to the AC power bus at a constant frequency.

11. The electric power generator of claim 10, wherein the permanent magnet exciter is decoupled from the main generator by the rotating bi-directional AC/DC/AC electric power converter system.

12. The electric power generator of claim 11, wherein the permanent magnet exciter is operable to generate electric power at a frequency that is variable coincident with the operation of the first rotor winding of the main generator at the constant frequency.

13. An electric power generator for an aircraft, comprising:
a two-stage variable-frequency generator including a main generator and a permanent magnet exciter, a controllable rectifier, and a controller;
wherein the permanent magnet exciter includes a first rotor winding that is coupled to a rotatable shaft;
wherein a first rotating bi-directional electric power converter and a second rotating bi-directional electric power converter are disposed adjacent to one another along the rotatable shaft;
wherein the controllable rectifier is arranged to rectify electric power between the first rotor winding of the permanent magnet exciter and a field winding of the main generator; and
wherein the controller regulates a stator output voltage of the main generator according to a control law.

14. The electric power generator of claim 13, wherein the control law operates in accordance with the following relationship:

$$V_6 = (M_1 \cdot \omega_{sh}^2 - M_2 \cdot I_3 \cdot \omega_{sh}) \cdot D$$

wherein:
$V_6$ represents the stator output voltage of the main generator,
$I_3$ represents current through the first rotor winding of the permanent magnet exciter,
$\omega_{sh}$ represents rotating speed of the shaft,
D represents duty cycle, value from 0 to 1, and
$M_1$ and $M_2$ represent constants.

15. A system for electric power generation in an aircraft, comprising:
an electric power generator having a rotatable shaft coupled to an engine, and a controller;
the electric power generator including a two-stage variable-frequency generator including a main generator, a permanent magnet exciter, a rotating bi-directional AC/DC/AC electric power converter system;
wherein the rotating bi-directional AC/DC/AC electric power converter system is coupled to the rotatable shaft;

wherein the rotating bi-directional AC/DC/AC electric power converter system includes a first rotating bi-directional electric power converter for AC/DC conversion and a second rotating bi-directional electric power converter for DC/AC conversion; and wherein the first rotating bi-directional electric power converter and the second rotating bi-directional electric power converter are disposed adjacent to one another along the rotatable shaft.

16. The system of claim 15, wherein the two-stage variable-frequency generator comprises a two-stage variable-speed variable-frequency generator.

17. The system of claim 15, wherein the rotating bi-directional AC/DC/AC electric power converter system being coupled to the rotatable shaft comprises a first rotor winding of the permanent magnet exciter and a second rotor winding of the main generator being coupled to the rotatable shaft.

18. The system of claim 15, wherein the controller includes a first controller for controlling the first rotating bi-directional electric power converter for AC/DC conversion, and a second controller for controlling the second rotating bi-directional electric power converter for DC/AC conversion.

19. The system of claim 18, wherein the first controller for controlling the first rotating bi-directional electric power converter for AC/DC conversion monitors voltage of a first rotor winding of the permanent magnet exciter and monitors voltage of the DC power link, and controls the first rotating bi-directional electric power converter to control voltage level of the DC power link based upon the voltage of the first rotor winding of the permanent magnet exciter and the voltage of the DC power link.

20. The system of claim 18, wherein the second controller for controlling the second rotating bi-directional electric power converter for DC/AC conversion monitors voltage of a generator rotor winding of the main generator and monitors voltage of a generator stator winding of the main generator, and controls the second rotating bi-directional electric power converter based upon the voltage of the generator rotor winding.

* * * * *